April 1, 1941. G. B. POLLOCK 2,236,917

FILM SPOOL MAGAZINE FOR ROLL FILM PHOTOGRAPHIC CAMERAS

Original Filed Aug. 12, 1935

INVENTOR.
Gordon B. Pollock
BY Joseph F. Westall
ATTORNEY.

Patented Apr. 1, 1941

2,236,917

UNITED STATES PATENT OFFICE 2,236,917

FILM SPOOL MAGAZINE FOR ROLL FILM PHOTOGRAPHIC CAMERAS

Gordon B. Pollock, Los Angeles, Calif.

Application August 12, 1935, Serial No. 35,801
Renewed July 27, 1939

7 Claims. (Cl. 242—71)

My invention relates to roll-film spool cartridges, magazines, or containers intended principally to be used with small hand photographic cameras for loading a roll of raw film in cartridge form into an appropriate chamber in a camera, which spool-cartridge will permit convenient manipulation of suitable lengths of film therefrom to a focal plane position for receiving the photographic exposure, and which, after each such exposure will facilitate transfer of such light-impressed portion of film to a similar and interchangeable spool-magazine, which, after exhaustion of the raw film from the first mentioned spool-cartridge and transfer of the last section of light-impressed film to said exposed film spool-container, will permit removal of said receiving cartridge from the camera without danger of fogging the film.

Principal objects of my said invention are to provide a neat, compact, easily manipulated, low priced, roll-film magazine, which not only will at all times protect all portions of the film from chance exposure-fogging, but which will provide a light and moisture proof receptacle in which the sensitized surface of the film during storage both before and after exposure, as well as while being manipulated in the camera will be protected against abrasion as well as from injury by contact of portions of the sensitized surface with adjoining backs of other portions of the film during extreme thermal conditions.

Other objects and corresponding advantages will be apparent to all of skill in this art upon study of the appended drawing and the detailed description to follow.

In the drawing:

Fig. 1 is a view on reduced scale with respect to the other views of the side wall with certain appended parts, before being rolled for assembled position;

Fig. 2 designates a plan view of the magazine with the upper cover or cap removed;

Figure 1:
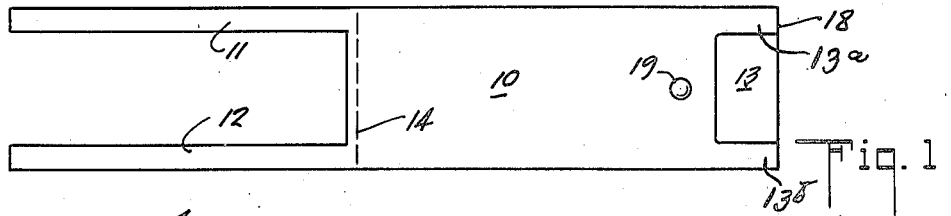
Figure 2:
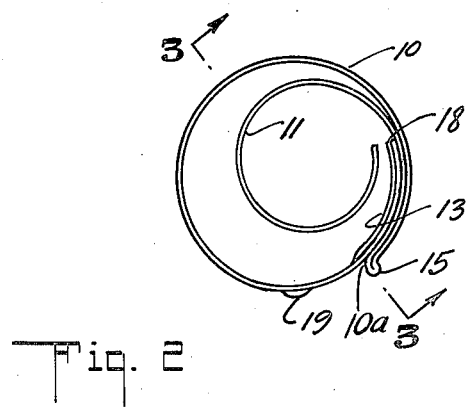

Referring more particularly to the drawing in which like numerals indicate similar parts throughout the several views, 10 designates a wall, substantially cylindrical when in assembled position, comprising a rectangular sheet preferably of thin spring metal, such as brass, provided with narrow longitudinal extensions 11 and 12 at one end (see particularly Fig. 1 where, unassembled, such wall is spread out flat), said wall 10 being rectangularly embossed at its other end to provide, for the purpose hereinafter described, a depressed flat surface or panel of a width less than the width of wall 10 as indicated at 13. The portions of the wall 10 at opposite sides of the depressed surface 13, provides abutments 13a and 13b respectively.

Before assembling with other parts to form the spool-magazine, extensions 11 and 12 of wall 10 are doubled back at the point indicated by dotted line 14 of Fig. 1, and at such point of doubling (which is also closely adjacent the vertical edge of wall 10 intervening between said extensions 11 and 12) the metal is bent to form a lip 15, for the purpose hereinafter described.

Figure 3:
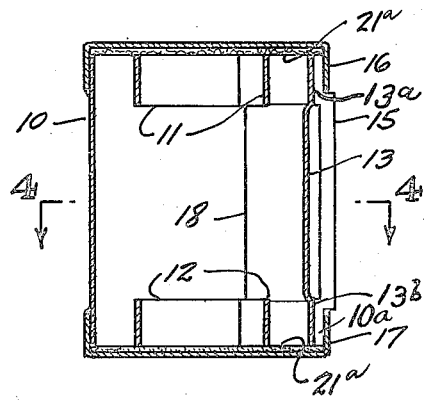
Fig. 3 is a section on line 3—3 of Fig. 2.
Figure 4:
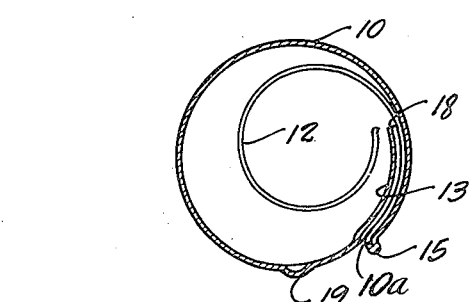
Fig. 4 is a section on line 4—4 of Fig. 3.
Figure 6:
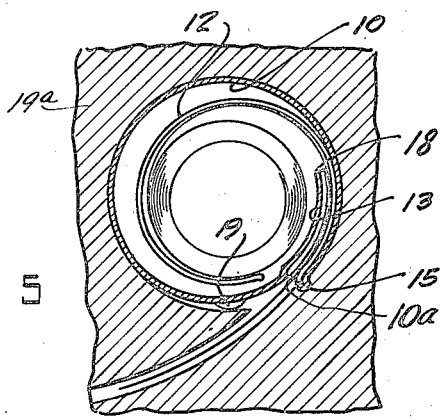
Fig. 6 is a section similar to Fig. 3, but showing a modified means for holding caps and walls in assembled position.
Figure 6:
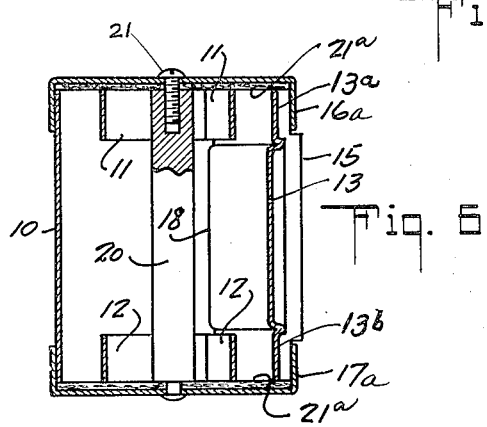

In assembled position, such as more clearly shown in the vertical sectional view of Figs. 3 and 6, wall 10 is rolled to an appropriate diameter and so as to inclose doubled-back extensions 11 and 12, which latter members, unattached beyond their point of folding, extend loosely and spirally within; and wall 10, being so rolled, is resiliently held in substantially cylindrical form by the placement of caps 16 and 17 over each end, thin felt pads 21a, circular in form, being placed in each of said caps, to insure a light-tight closure.

In the embodiment shown in Figs. 1 to 5 inclusive, caps 16 and 17 are secured in assembled positions by partially soldering or brazing their respective inclosing flanges to upper and lower edges of wall 10, such soldering or brazing, however, being omitted for a space, the extent of which will be readily determined by any of skill in this art, adjacent the film aperture hereinafter described, for the purpose of utilizing the resiliency of wall 10 adjacent said aperture and within, to maintain the same, as a light trap, normally closed.

It will be noted that wall 10 is of sufficient length, proportionately, to permit when rolled in assembled position its end terminating in lip 15 to overlap its opposite end 18, with panel 13 being overlapped by said wall 10 and curved substantially parallel to the portion of the wall which overlaps it. It will be observed that extensions 11 and 12 have a portion of their lengths passing between said overlapped ends of wall 10, which extensions contact abutments 13a and 13b respectively. Between lip 15 and the end of wall 10 to which panel 13 is connected, a slot 10a is formed parallel to the axis of the substantially cylindrical container which wall 10 comprises.

Resiliency of the portion of said wall 10 terminating in overlapped portion 18 results in normally pressing the abutments 13a and 13b against extensions 11 and 12 respectively. The depressed surface or panel 13 and the portion of wall 10 overlapping the panel are thus spaced from a plane through and parallel to the face of abutments 13a and 13b which contact the extensions 11 and 12, respectively, thereby forming a curved channel into the container. The channel thus formed is preferably of sufficient length to form an effective light trap. A boss 19 is provided intermediate the side edges of wall 10 adjacent depressed surface 13 to engage the inside wall of an approximately cylindrical compartment in camera 19a (as more clearly shown in Fig. 5 of the drawing) so as to partially eliminate resilient contact between overlapped ends of wall 10 while the spool-magazine is in the camera, thus to permit free movement of the film from or to respective spool-magazines.

In the embodiment shown in Fig. 6 a pillar 20 riveted to the axial center of cap 17a and extending vertically, forms an axis of the magazine cylinder, being vertically bored and internally screw-threaded at its upper end to receive screw 21 which extends through an appropriate aperture in the axial center of cap 16a and is threaded into said bore, thus to secure both caps 16a and 17a in assembled position with wall 10 and its appurtenances.

It will be apparent that the film may be manipulated between the resilient overlapping closure-ends of wall 10, and that lip 15, acting as a guide during its passage through the space between said overlapped ends, will contact only at its margin due to the rectangular indentation 13 and the portions of extensions 11 and 12 in contact with the edges of the film between overlapped portions of wall 10. When the film upon entering the magazine, passes the space between such overlapped ends of wall 10, it is received and carried by the resiliency of spirally disposed extensions 11 and 12, which guide its progress in forming a roll, and which at the same time gently impel successive convolutions of film to wind with sufficient tightness to conserve space.

Figure 5:
Fig. 5 is a sectional view of said film magazine illustrating its use within an appropriate chamber of a camera designed for its use, such as described in my co-pending application, Serial No. 24,208, filed May 31, 1935, for Cameras, now Patent No. 2,129,959 of September 13, 1933.

Before removing from the camera 19a a slight turn of the film magazine (counterclockwise as shown in Fig. 5) will disengage bosses 19 from the interior wall of the camera film compartment and will permit a tight closure of the film aperture of the spool-magazine.

Contact means for moving the film from or into its spool-magazine while in the camera is disclosed and covered in my co-pending application above referred to.

While I have shown and described what I believe to be a preferable embodiment of my invention, in which resiliency of a portion of the cylindrical walls of the container is preserved and utilized to more securely close the light-trap between overlapped end portions of the substantially cylindrical wall it will be obvious to all of skill in this art that any suitable non-resilient material may be used, long overlapping portions of said non-resilient wall being spaced apart a barely sufficient distance for the passage of the film therethrough, providing in itself a sufficient light-trap, owing to its comparative length and curvature, which alone will prevent any damaging amount of light to enter the film magazine. If non-resilient members 11 and 12 are used, a magazine is provided which cannot be re-used since the members 11 and 12 will not return to their original conformation after having once been distorted.

It will also be apparent that resiliency of the extensions 10 and 11, or their equivalents, is not absolutely essential to operativeness or practicability, as a spirally-disposed extension or extensions of non-resilient material will obviously guide the film as it is pushed through the aperture slot into the cylinder into a roll.

I do not limit myself to any such details of construction or design as I believe invention resides in the combination illustrated and described, regardless of any resilient qualities of any of the elements and notwithstanding changes of form, such as those above outlined.

It is also quite clear that other means than those above specifically described, for holding the parts in assembled position may be employed—all without departing from the spirit of my invention.

What I claim and desire to cover by Letters Patent is:

1. In a device of the character described, an enclosure, a film magazine within said enclosure, in form substantially of a hollow cylinder, a portion of the cylindrical wall of which extends spirally within an overlapped portion of said wall, thus forming an aperture between said overlapped portions of the cylindrical wall, a boss on said cylindrical wall adjacent the inner overlapped portion thereof between said inclosure and the wall of said container to space apart the overlapped walls forming said aperture to permit movement of film into and out of the interior of said cylinder.

2. In a device of the character described, a tube comprising a substantially cylindrical wall having its ends overlapped, closure plates for the ends of said tube, the middle portion of the innerlapped portion being indented to provide a narrow passage for the insertion of film, a strip adjacent each edge of the inside of the outer lapped portion of said wall forming a channel between the lapped portions of the wall intermediate said strips, said strips extending spirally into said tube so as to spool film inserted through said channel.

3. In a device of the character described, a wall forming a cylindrical container having a slot therein parallel to the axis of the container, a panel of a width less than the width of said wall connected to the wall adjacent said slot and extending into said container substantially parallel to an adjacent portion of the wall, spacing means connected to opposite side edges of said panel and abutting means connected to the part of the container wall overhanging said panel and extending along the inner surface of the side portions of said overlapping part of the container wall, the adjacent faces of said last-named means and said spacing means, respectively, being in abutting relation to space the panel and the portion of the overhanging cylinder wall between said spacing and abutting means from a plane through the contacting faces of said spacing means and abutting means, and thereby form a composite channel for the passage of film into said container comprising the opposed channels formed between the above mentioned means connected to said panel and the wall overhanging said panel, respectively, said means connected to the portion of the container wall overhanging said panel being extended spirally into said container to spool film inserted through said slot.

4. In a device of the character described, a substantially cylindrical container comprising a spiral wall having a slot formed therein parallel to its axis between the overlapping portions of said wall, means extending along and lying against the opposite edges of the inner surface of the overlapping portion of said wall to space said overlapping portion from the inner lapped portion of said spiral wall and extended into said container in an arc of smaller radius than the wall of said container to spool film fed through said slot, and means integral with the opposite edges of the outer surface of the lapped portion of said wall to space said lapped portion from said last mentioned means, the means integral with said lapped portion of said wall and the first named means being separable for the passage of the opposite side edges of a strip of film, there being an unrestricted channel formed between said spacing means and between adjacent surfaces of said lapped and overlapping edges respectively, for the passage of the middle portion of a strip of film.

5. A film magazine in the form of a substantially hollow cylinder, a portion of the wall of said cylinder extending spirally within an overlapped portion thereof thus forming an aperture between said overlapped portions of said cylindrical wall to permit manipulation of film into and out of the interior of said cylinder, and a pair of spaced parallel strips connected to the ends of said overlapping portion of said cylindrical wall and extended spirally within said cylinder so as to space the lapped portions of said wall and impel spooling of film urged through said aperture, said strips forming the sides of an unrestricted channel therebetween on the inside of said outer portion of said wall.

6. In a cassette, members defining an enclosed space for film, a light trap permitting entrance and exit of film therethrough without fogging film within said cassette, and at least one finger in said cassette shaped to an arc of relatively small radius and adapted to curl an initial convolution of film forced into said cassette through said light trap, and to be displaced by additional convolutions, said finger being of non-resilient metal, whereby said displacement is permanent, and whereby said cassette having once been used for the reception of exposed film, is not adapted for re-use.

7. In a cassette, members defining an enclosed space for film, inner and outer portions defining a non-rectilinear passageway from the outside of said cassette to the inside thereof, said passageway constituting both a light trap, and a path for the entry and withdrawal of film, and fingers within said cassette and curved and positioned to receive the end of a film forced into said cassette through said passageway and conform it to a circular convolution of relatively small diameter, said fingers being distortable to accommodate additional convolutions as more film is forced into said cassette and coiled therein, said fingers further being of non-resilient substance capable of retaining the distortion so produced, so that said cassette, after use for reception of one film, becomes unsuitable for the reception of another film because of the distortion of said fingers.

GORDON B. POLLOCK.